Figure 1:
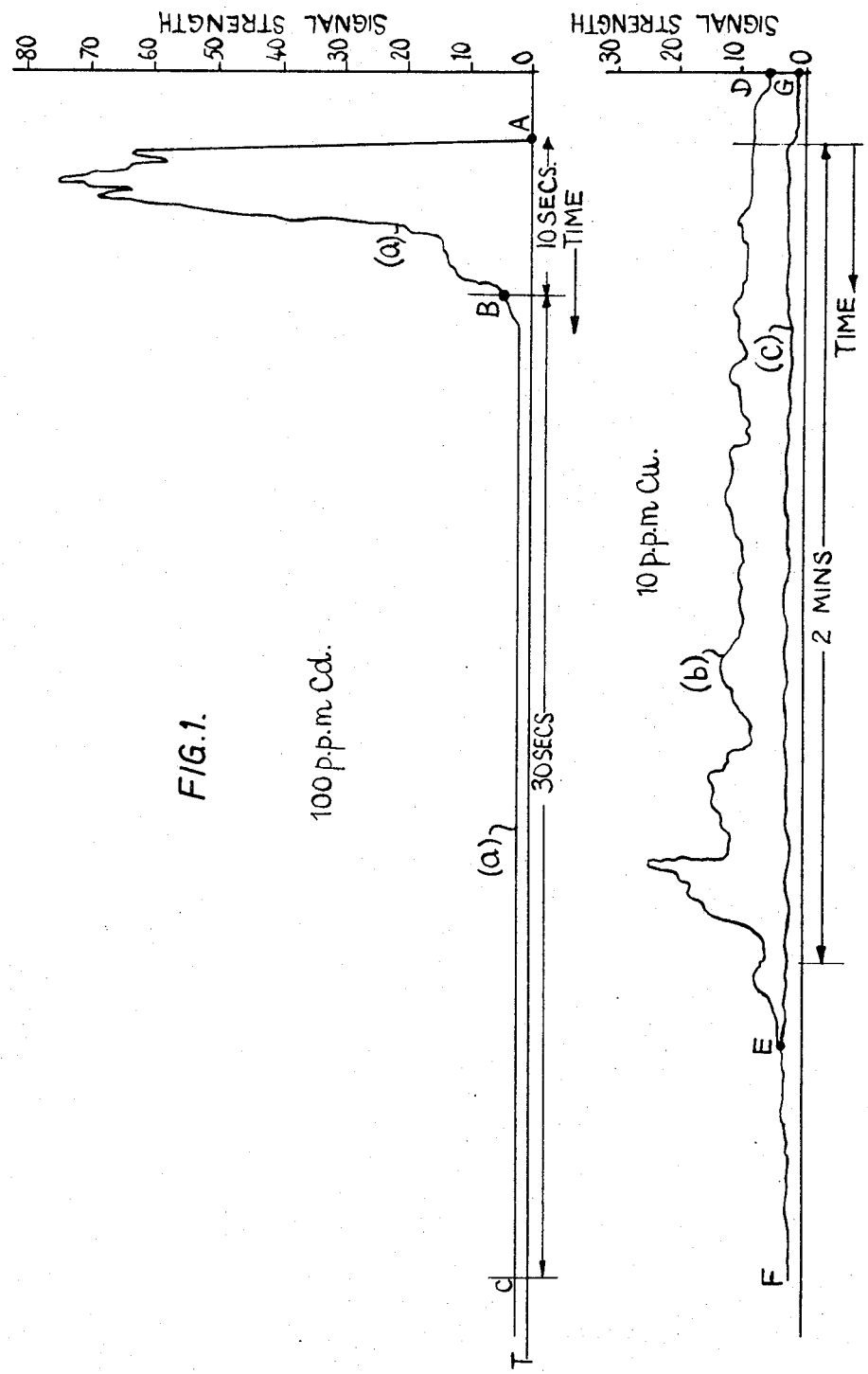

United States Patent [19]

Cooper et al.

[11] 3,729,259

[45] Apr. 24, 1973

[54] METHOD AND APPARATUS FOR MAKING SPECTROMETRIC MEASUREMENTS OF A CONSTITUENT OF A TEST SAMPLE

[75] Inventors: Brian Sydney Cooper; John Edward Cronk; Derek John Hobbs, all of London, England

[73] Assignee: Johnson, Matthey & Co., Limited, London, England

[22] Filed: Feb. 25, 1971

[21] Appl. No.: 118,925

[30] Foreign Application Priority Data

Mar. 2, 1970 Great Britain..................9,970/70

[52] U.S. Cl....................................356/82, 356/86
[51] Int. Cl..........................G01j 3/36, G01j 3/30
[58] Field of Search....................356/74, 76, 82, 86

[56] References Cited

UNITED STATES PATENTS

| | | |
|---|---|---|
| 3,227,038 | 1/1966 | Earle....................................356/86 |
| 3,337,738 | 8/1967 | Price....................................356/86 |
| 3,359,850 | 12/1967 | Baird....................................356/86 |

OTHER PUBLICATIONS

"A Method of Background Correction...", Leys Analytical Chemistry; Vol. 41, No. 2, Feb. 69, 396–398.

Fundamentals of Analytical Chemistry; Skoog et al., Holt, Rinehart & Winston, 1963, pg. 682.

Primary Examiner—Ronald L. Wibert
Assistant Examiner—V. P. McGraw
Attorney—Cushman, Darby & Cushman

[57] ABSTRACT

This specification describes a method of carrying out spectrometric measurements of a constituent of a sample, for example a constituent of an alloy in which the intensity of spectral light in one or more wavelength bands is recorded and at least one of the bands includes the spectral light due to the constituent to be investigated. The sample is subjected to volatilization and the record of the intensity is continued until and for at least a short time interval after at least a major part of the constituent has been volatilized from the sample.

8 Claims, 3 Drawing Figures

METHOD AND APPARATUS FOR MAKING SPECTROMETRIC MEASUREMENTS OF A CONSTITUENT OF A TEST SAMPLE

This invention is concerned with improvements in and relating to spectrometers and spectrometry.

In particular, the invention relates to methods and means for obtaining, with the use of a spectrometer, measurements at least representative of the quantities of specified elements present in a sample of material under test.

The invention is especially, but not exclusively concerned with methods and means for the rapid analysis of a metal sample containing traces of impurity metals in the range 0.1 - 1 ppm.

A spectrograph used with a d.c. arc provides a convenient and sensitive means for the quantitive determination of, for example, impurity elements in a given sample of metal.

One way of carrying out such a determination is to volatilize the sample in a d.c. arc struck between graphite electrodes, to obtain a spectrum of the light emerging from the arc by means of the spectrograph and to photograph the spectrum and then to obtain measures of the densities of the images of the spectral lines of the various elements on the resulting photographic plate. From a knowledge of the densities of the images of the corresponding lines produced when one or more spectra of the same metal containing known quantities of the impurity elements are obtained under the same conditions of excitation and when the photographic plate is exposed and developed under the same conditions as for the test sample, it is possible to estimate the quantities of the impurity elements present in that sample.

This is, however, a tedious and lengthy process requiring considerable skill and expertise on the part of the operator. It is not particularly suitable for the rapid, routine testing of samples in a manufacturing process, for example.

For this latter purpose a recording spectrometer specially adapted for the determination of the quantities of certain specified elements in a sample is frequently used.

A spectrometer of this type is typically provided with an array of 30-40 exit slits, each slit being so arranged that only the light of a selected part of the spectrum produced by the spectrometer will pass through it. Normally, each exit slit is such that the light of a single spectral line due to a single element in the sample, will pass through it. On occasions, an exit slit may permit the passage through it of the light of two or more spectral lines when these are due to a single element in the sample and are separated by one or more small wavelength intervals.

Means are associated with each exit slit for recording the total quantity of light which passes therethrough in a certain interval of time. The said means frequently comprises a photomultiplier or other such light-sensitive device preferably having an electrical output linearly related to the intensity of the light energy incident upon it and an electrical circuit including a capacitor connected to the output of the photomultiplier or other device. The output of electric current from the photomultiplier is proportional to the light energy incident upon it and the capacitor collects or 'integrates' the electrical output of the photomulplier so that, at the end of a given time interval, the charge which has accumulated in the capacitor (or the increase in the potential difference between its plates which is proportional thereto) is proportional to the total quantity of light which has fallen on the photomultiplier and hence to the total quantity of light which has passed through the slit in that interval.

When a spectrometer of the foregoing type is used for the quantitative determination of, for example, impurity metals in a given metal (the so-called "Matrix" metal) a d.c. arc is struck between graphite electrodes with a small sample of known, standard weight of the impure matrix metal located in a cup in the tip of the lower electrode. The spectrum of the light emerging from the arc is then formed by the spectrometer, the light of selected parts of the spectrum as defined by the exit slits falls upon the photomultipliers and, as a result, their associated capacitors are charged to a greater or lesser extent.

If the light falling on each photomultiplier resulted solely from the excitation of the atoms of a single element in the sample, the charge on each capacitor after a given time interval would be proportional to the quantity of that element present in the sample. In practice this is not so because:

a. "background" light energy from the arc plasma itself and from the incandescent tips of the electrodes is included with the light energy in a given part of the spectrum due to a given element.

b. It is never possible to set the width of an exit slit so that only light in the narrow wavelength band due to a given element and the associated background (the characteristic spectral lines of the element) passes through the slit. In practice, it is necessary to have each exit slit at least three times as wide as the entrance slit to the spectrometer so that if, as a result of temperature changes and the like, any slight dimensional changes or distortions of the spectrometer body occur so as to cause the spectrum to be displaced with respect to the exit slits, light in the required wavelength band will continue to pass through each slit and will not be screened by one or other of the jaws of the slit. Because of this need to have the exit slits relatively wide, background energy on each side of the required wavelength band will pass through the slits and will affect the final capacitor readings.

c. When a sample containing a number of impurity elements is tested, some will be completely volatilized out of the sample before the others and before the arc is quenched. The photomultiplier(s) "reading" the wavelength band(s) (the spectral line(s)) corresponding to these elements will, after they have volatilized continue to "read" background light both in the required wavelength band and on either side of it (as in (b) above) and the final charge(s) on the capacitor(s) will be correspondingly higher.

When samples containing relatively high proportions of impurity elements (say, more than 10 ppm) are tested, errors due to the background light energy which falls on the photomultipliers may not be significant. This will be so when the intensity of the light in a wavelength band, due to a particular element, which passes through an exit slit is significantly higher than the intensity of the background light which also passes through the slit.

In such cases, it is simply necessary to record the voltage changes on the relevant capacitors when the sample under test has been consumed in the arc and then to determine the proportionate amounts of impurity elements in the sample from previously prepared calibration graphs.

Such calibration graphs are prepared by testing, in the manner described above for a test sample, a series of samples of standard weight of the same matrix metal, each such sample containing known and different proportions of various impurity metals. A graph is then plotted, on log-log paper, for each impurity metal, of the change in the voltage across the relevant capacitor against the proportion of impurity metal present in the sample.

It is generally found that these calibration graphs are substantially linear for concentrations of impurity metal greater than 10 ppm.

At lower concentrations, however, the background, which is read by each photomultiplier — integrating capacitor combination and which remains substantially constant as the proportion of impurity metal decreases, becomes increasingly significant and the graph becomes non-linear. It is, therefore, difficult to extrapolate the graph for lower concentrations of impurity and, if test measurements for these concentrations are to be made, actual calibration measurements for impurity concentrations at least as low as the lowest concentration to be tested should be made.

It is possible to prepare 'calibration' samples of a given matrix metal containing impurity metals down to about 1 ppm and even below and to test these and extend the calibration graph accordingly. As the proportion of impurity metal decreases towards extremely low orders of impurity, however, the spectral light due to the impurity metals tends to be 'swamped' by the background and the measurements become increasingly suspect.

It is an object of this invention to provide a method of carrying out spectrometric measurement in which the effect of the background, as hereinbefore described, is eliminated or, at least, substantially reduced.

It is a further object of the invention to provide means for carrying out such spectrometric measurements.

According to one feature of the invention a method of carrying out spectrometric measurements comprises recording the intensity of the spectral light in one or more wavelength bands, at least one of such bands including the spectral light due to an element in a sample under test and continuing to record the said intensity until and for at least a short time interval after, the said element or a major part of it has been volatilized out of the said specimen.

The background light energy may be recorded separately and, in order to obtain the spectrometric measurement of a particular element spectral light values representing the background are subtracted from the record of spectral light values representing the element whose spectrometric measurement is required. Alternatively, the background may be substantially suppressed so that a single record alone is required for any particular element.

Figure 2:
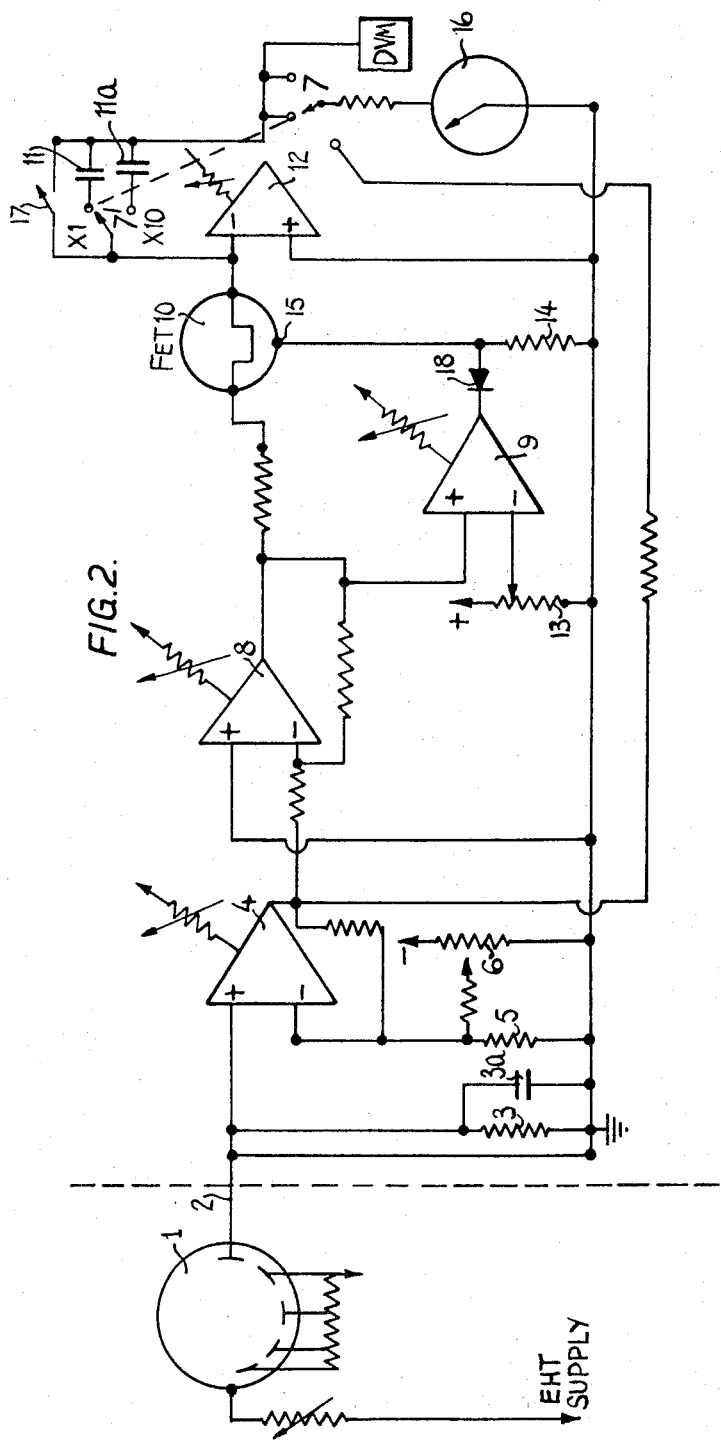
Figure 3:
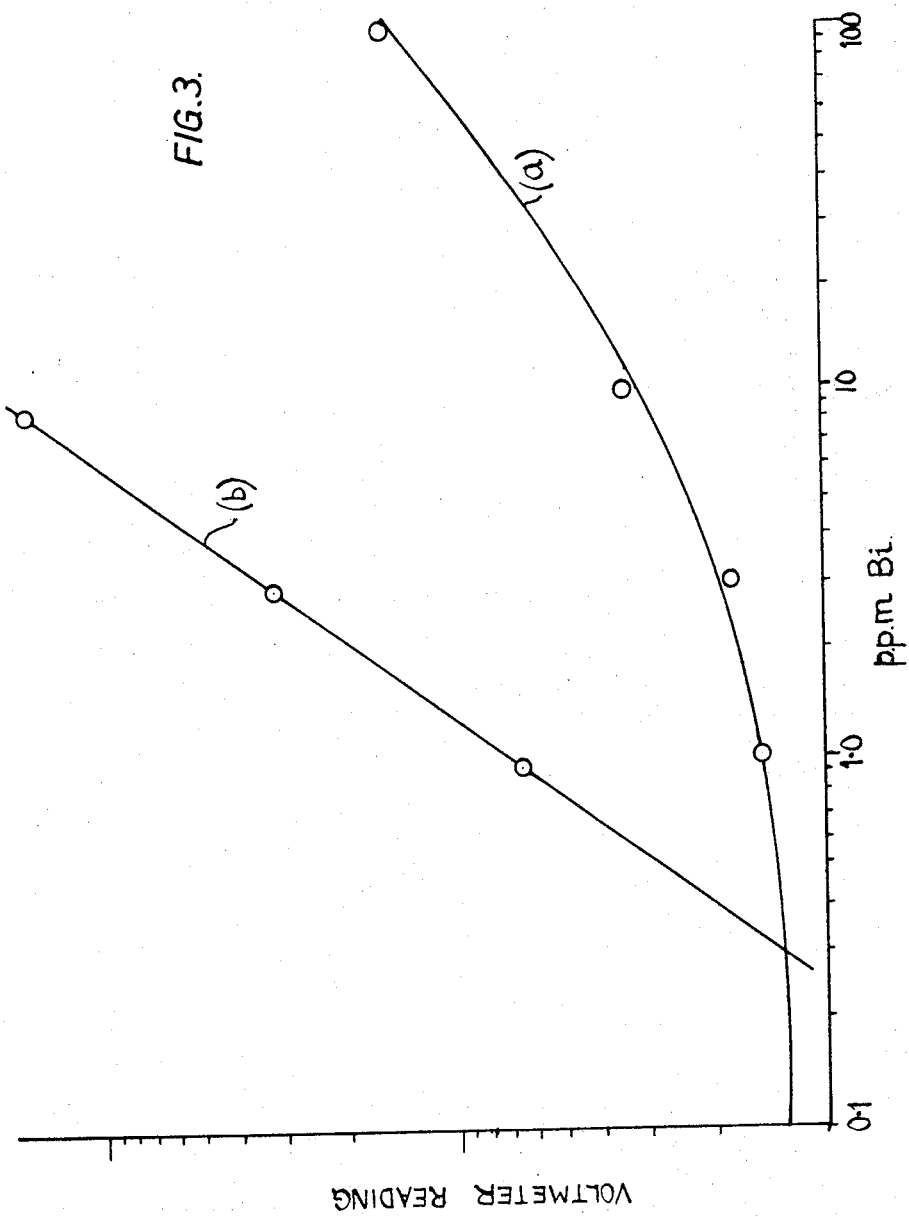

The invention will now be described with reference to the attached drawings of which FIG. 1 represents chart recorder traces obtained when spectrometric measurements according to one feature are made, FIG. 2 is a diagram of a circuit which integrates the output from a photomultiplier and suppresses background signals, and, FIG. 3 are calibration graphs prepared from spectrometric measurements with, and without background signals.

One way of putting the invention into effect in connection with a spectrometer of the type provided with a series of exit slits as previously described, is to connect a high speed chart recorder to each photomultiplier, or at least to each photomultiplier from which an output due in part to the light of a spectral line is expected and then to volatilize and excite the test specimen in a d.c. arc as previously described and to allow light from selected regions of the resulting spectrum to pass through the exit slits on to the associated photomultiplier. The chart recorders continue to operate until the specimen is completely consumed.

Parts of typical resultant charts are shown in FIG. 1. In this Figure, line (a) represents the trace obtained from the recorder connected to the photomultiplier reading a wavelength band including the light of one of the cadmium lines when silver containing 100 ppm of cadmium and 10 ppm of copper was tested. Line (b) similarly shows the trace for copper.

As is apparent from line (a), the cadmium was volatilized out of the sample after about 10 seconds. Thereafter the trace represents the background. The area between part AB of the line (a) and the base line OT represents the total spectral light energy which passed through the appropriate slit in the first 10 seconds of the test. This light was the sum of the light of the cadmium line and the background light. The problem is to obtain a figure representing the integrated intensity of the cadmium light. This is done by measuring the area under at least part of section BC of the trace to obtain a measurement representing the background, calculating (if necessary) the value which this area would have for 10 seconds of the trace BC and then subtracting the said value from the area under part AB of the line.

The areas under the line ABC may be measured by any suitable means although, for this purpose, a ball and disc integrator associated with the chart recorder has been found to be very suitable.

From line (b) of FIG. 1 it is apparent that the copper in the sample volatilized much more slowly than the cadmium. The area under part DE of line (b) represents the total light energy of a copper line in the sample and of the background light which passed through the appropriate exit slit in just over 2 minutes. The area due to the copper alone could be determined as before by obtaining a measure for the background from part EF of the line and then subtracting this value from the area under part DE.

An alternative method is to repeat the process using pure silver free from the impurities and to obtain a further chart recording of the type shown by line (c) in FIG. 1. The area under part GE of line (c) then represents the background for part DE of line (b) and is subtracted from the area under this part of line (b).

The method as just described of eliminating the background from spectrometric measurements according to one feature of the invention may equally well be applied to a photographic plate bearing an image of the spectrum of the test sample. In this case, light is passed through the photographic plate and a narrow slit through which such light may thereafter pass on to a photomultiplier, is moved parallel to a line on the plate corresponding to the impurity elements so that the line and the background on at least one side of it is, in effect, scanned by the photomultiplier.

As before the photomultiplier is connected to a chart recorder and traces similar to those shown in FIG. 1 will be obtained. The area under them due to the impurity elements concerned are then calculated as described with reference to line (a) in FIG. 1.

An alternative method of eliminating the background when spectrometric measurements are made using a recording spectrometer with an array of exit slits as previously described is to arrange for only that part of the output from each photomultiplier to be integrated which lies above a threshold value which is equal to or slightly above the output due to the background.

One circuit arrangement whereby this may be done is shown in FIG. 2.

Here the output terminal of the photomultiplier 1 is connected via line 2 to the "non-inverting input" of the balanced operational amplifier 4 and, via the resistor-capacitor combination 3,3a to earth. When the photocathode of the photomultiplier is illuminated, current flows into the photomultiplier from the earth line and the negative voltage accordingly developed across the resistor 3 is applied to the positive terminal of the amplifier.

A negative background compensating voltage, which is developed across resistor 5 and which may be varied at will by means of the potentiometer 6, is applied to the − (inverting) input of amplifier 4. This voltage is equal to the approximate mean value of the voltage which is developed across resistor 3 and hence applied to the non-inverting input of the amplifier, and when only background light, which fluctuates slightly is falling on the photomultiplier. The manner in which this background voltage is determined, is described later.

When the voltage applied to the non-inverting input of amplifier 4 is equal to that applied to the inverting input, there is no output from the amplifier. When it rises above or falls before the voltage applied to the inverting input, the output is equal to the difference between the two input signals, but amplified ten-fold and of appropriate sign. Thus, when the voltage applied to the non-inverting input is less negative than that applied to the inverting input, the output is positive. When it is more negative, the output is negative. It follows that the output from amplifier 4 when background light only is falling on the photomultiplier is a fluctuating voltage and current waveform with positive and negative excursions about a zero level. It also follows that when the intensity of the light falling on the photomultiplier increases about that due to the background, the output from the amplifier becomes progressively more negative.

The output from amplifier 4 is fed to a selector switch 7 and also to the inverting input of a second balanced operational amplifier 8. Since the non-inverting input of this amplifier 8 is connected to the earth line, the output will be zero when the voltage applied to the inverting input is zero and positive when the said voltage is negative.

The output from amplifier 8 is connected to a field effect transistor (FET) 10, which is arranged to act as a switch, and also to the non-inverting input of a balanced operational amplifier 9. As will be described later, the FET controls the flow of current from the output of amplifier 8 to an integrating circuit comprising the capacitors 11, 11a and a balanced operational amplifier 12.

A positive "threshold" reference voltage, which may be varied at will by means of the potentiometer 13 is applied to the inverting input of the amplifier 9. When the positive voltage applied to the non-inverting input terminal is less than the threshold voltage, the output from the amplifier 9 is "negative" and current flows from the earth line through resistor 14 into the amplifier. As a result, the terminal 15 of FET 10 is held negative and FET 10 is in the non-conducting state.

When, however, the positive voltage applied to the non-inverting input terminal of amplifier 9 is larger than the threshold voltage, the output of the amplifier is positive, the polarity of terminal 15 of FET 10 is positive and FET 10 is in the conducting state. Current then flows from the output of the amplifier 8 and charges one or other of the capacitors 11, 11a, depending upon the setting of the selector switch 7'.

The threshold voltage is set to such a value that the FET switches on when the output of amplifier 8 goes slightly positive.

The rectifier 13 is provided in the output line from amplifier 9 to prevent heavy positive currents flowing from the amplifier.

When background light only is falling upon the photomultiplier 1, an amplified, autiphase facsimile of the output waveform of amplifier 4 appears at the output of amplifier 8.

The positive excursions of the output from amplifier 8 correspond to increasing illumination of the photomultiplier and the threshold reference voltage applied to amplifier 9 is so set that the FET will be switched on when the output from amplifier 8 is slightly more positive than the maximum positive excursions of this output when it is due to the background only.

In practice, a circuit arrangement of the type just described is connected to each photomultiplier associated with a spectrometer exit slit. One way in which a spectrometer so equipped may be used for the determination of impurity metals, say, in a given matrix metal is as follows.

Firstly, it is necessary to set the background voltage applied to each amplifier 4. This is done by "burning" a sample of pure matrix metal in the spectrometer arc and with the selector switch 7 in the 'set' positive, adjusting potentiometer 6 until the needle of voltmeter 16 is making small excursions on either side of the zero position. Once the background voltage is set in this way, it should not need to be altered until a different matrix metal is to be examined.

Alternatively, the switches 7,7' may be turned to the position shown in FIG. 2 and the background voltage slowly increased from a low value, until the voltmeter 16 just stops indicating an increase in the voltage across the capacitor 11.

Yet a further way of setting the background reference voltage is to connect a high speed chart recorder to one of the photomultipliers and then to obtain a trace for the matrix metal along in the manner previously described. The output voltage of the background may then be obtained from the chart and the appropriate background reference voltages set by adjustment of the potentiometers 6. For this purpose, it is, of course, necessary for each potentiometer 6 to be calibrated in terms of the reference voltage.

When all the circuits have been set as described, the spectrometer is ready for use for the determination of, say, the impurities present in a given matrix metal. In order to do this, all the capacitors 11, 11a are discharged by closing and opening each reset switch 17, switches 7, 7' are set to an appropriate range setting, a sample of standard weight of the impure matrix metal is burnt in the arc and this process continued until the sample has completely burnt away, the arc is extinguished and the reading of each voltmeter 16 is recorded. The proportions in the sample of the various impurity metals to which these voltmeter readings correspond are then read off from previously prepared calibration charts. If desired a single voltmeter 16 may be used in which case the voltmeter is switched in sequence into circuit with the various capacitors.

These calibration charts, as previously explained, are prepared by burning in the arc a series of samples of standard weight of the matrix metal containing known but different amounts of impurity metals; obtaining a set of voltmeter readings for each sample in the manner described above and plotting the readings for each voltmeter against the proportions of the corresponding impurity metal present in each sample.

The circuit of FIG. 2 may also include a digital voltmeter (DVM) for measuring an increase in the voltage across the capacitors 11, 11a.

When the spectrometer equipped with circuit arrangements of the type described above is used in the manner described, the effect on the background on the voltmeter readings is eliminated since the capacitors 11, 11a will only be charged when the intensity of the light falling on the photomultipliers is greater than the intensity of the background light.

This is clearly illustrated in FIG. 3 in which line (a) is a calibration graph for bismuth in silver plotted from measurements obtained without background compensation and line (b) is a calibration graph plotted from measurements obtained with the use of the background compensating circuit arrangement described above.

Line (a) is highly non-linear towards the lower orders of impurity concentrations, but curve (b) is linear and may be extrapolated towards these lower orders. Graphs precisely similar to line (b) are obtained when they are plotted from background compensated readings obtained from a chart recorder trade as previously described.

Although the invention has been described with reference to the determination of impurity metals in a given matrix metal, it is not, of course, so limited and may be used for any analogous spectrometric measurements. The invention is also not limited to d.c. arc spectrometry and may equally well, for example, be used in connection with spark spectrometry.

What we claim is:

1. A method of carrying out spectrometric measurements of a constituent of a sample under test comprising recording sequentially the intensity of spectral light in one or more wave length bands, at least one of such bands including the spectral light due to the constituent to be investigated in the sample and the background light by subjecting the sample to volatilization and continuing to record the intensity until and for at least a short time interval after at least a major part of the said constituent has been volatilized from the sample, whereby a single recording of the intensity light due to the constituent and background light is recorded.

2. A spectrometer for carrying out a spectrometric analysis of a sample under test comprising:
   means for isolating one or more wavelength bands of spectral light including the spectral light derived from a particular constituent of the sample,
   a light sensitive receiver, associated with a wavelength band and for producing a signal proportional to the amount of light energy received thereby,
   means for modifying the signal to produce a signal proportional only to the amount of light energy due to the said constituent by using a potential dividing means associated with one terminal of an amplifier and adjustable to set the output of the amplifier to zero when the receiver which is connected to the other terminal of the amplifier produces a signal proportional to the light energy received thereby and derived from a calibration sample not containing the said constituent, and
   integrator means for integrating the modified signal during at least the period of time taken to volatilize from the sample at least a major part of the said constituent to obtain thereby a measure of the total light energy drived from the said constituent received by the light sensitive receiver and thus a measure of the proportion of the said constituent in the sample.

3. A spectrometer according to claim 2 including a threshold device operative to open or close a switch when the modified signal is respectively greater or is less than a predetermined magnitude thereby initiating or terminating operation of the integrator means.

4. A spectrometer according to claim 2 wherein the light sensitive receiver comprises a photomultiplier tube.

5. A spectrometer according to claim 2 wherein the integrator means comprises an operational amplifier including in a feedback loop thereof a capacitative reactance.

6. A spectrometer according to claim 5 wherein the operational amplifier includes two or more capacitative feedback loops and a switch for selecting a particular feedback loop required.

7. A spectrometer for effecting a spectrum analysis of a sample under test comprising
   means for isolating one or more wavelength bands of spectral light including the spectral light derived from a particular constituent of the sample, a light sensitive receiver for producing a signal proportional to the amount of light energy received thereby and connected to an amplifier stage, a potential divider adjustable to set to zero the output of the amplifier stage when the spectral light received by the receiver is derived from the sample not containing the said constituent, a threshold device operative to open or close a switch when the output of the amplifier stage or a subsequent amplifier stage is respectively greater or less than a predetermined magnitude to connect thereby with an integrator means the output of that stage for integration during the period for which the switch is open.

8. A spectrometer according to claim 7 wherein the light sensitive receiver comprises a photomultiplier tube.

* * * * *